Jan. 5, 1965  A. MULATS  3,164,077

SHUTTER-DIAPHRAGM ASSEMBLY FOR CAMERAS

Filed May 21, 1962

*INVENTOR.*
*ALBERT MULATS*

BY

*Michael S. Striker*
*Atty*

United States Patent Office 3,164,077
Patented Jan. 5, 1965

3,164,077
SHUTTER-DIAPHRAGM ASSEMBLY FOR
CAMERAS
Albert Mulats, Munich, Germany, assignor to Agfa Aktiengesellschaft, Leverkusen-Bayerwerk, Germany
Filed May 21, 1962, Ser. No. 196,210
Claims priority, application Germany, May 19, 1961,
A 16,708
7 Claims. (Cl. 95—63)

The present invention relates to cameras.

More particularly, the present invention relates to shutters of photographic cameras.

In particular, the present invention relates to a shutter which at the same time is capable of acting as a diaphragm. Although assemblies where the shutter blades also perform the function of the diaphragm are known, these assemblies are in general extremely complex and have several disadvantages both with respect to the amount of space required for the parts as well as with respect to the reliability of operation thereof.

It is a primary object of the present invention to provide for a camera a shutter construction which can also operate as a diaphragm and which at the same time is of an extremely simple construction.

Another object of the present invention is to provide a structure of this type which allows the operator with an extremely simple reliable construction to preselect the size of the exposure aperture.

Still another object of the present invention is to provide a structure of the above type which can very easily be combined with an adjustable retarding mechanism for setting the exposure time.

It is furthermore an object of the present invention to provide a structure of the above type which is extremely compact so that a very small amount of space is required for the structure of the invention.

With the above objects in view the invention includes, in a shutter-diaphragm assembly for a camera, a support means and a plurality of shutter blades turnably carried by the support means for movement between a closed and an open position. A rotary shutter ring cooperates with these blades to turn the latter from their closed to an open position when the rotary shutter ring turns from a given rest position thereof, and a first spring of the assembly of the invention is connected to the rotary shutter ring to urge the latter to return to its starting or rest position. A rotary cocking ring is also turnably carried by the support means and a second spring, which is stronger than the first spring, urges the cocking ring to a given rest position, this cocking ring being turnable from this rest position thereof to a predetermined end position and then back to its rest position. A manually operable means cooperates with the cocking ring to turn the latter in opposition to the second spring from its rest to its end position, and then the manually operable means releases the cocking ring for return movement back to its rest position by the second spring. A coupling means cooperates with both of these rings to couple the cocking ring to the shutter ring when the cocking ring is released for return movement back to its rest position, and when thus coupled to the cocking ring, the shutter ring will turn with the cocking ring in opposition to the first spring, and during this turning movement of the shutter ring with the cocking ring the shutter blades are moved from their closed position to an open position. A cam is adjustably carried by the support means and the operator is capable of adjusting the cam so that this cam will cooperate with the coupling means to uncouple the latter after the shutter ring has turned with the cocking ring through a given angle providing a given opening of the shutter blades, so that the adjustment of this cam will set the size of the exposure aperture. Once the coupling means is uncoupled by the cams the shutter ring no longer turns with the cocking ring and thereupon the first spring is capable of returning the shutter ring back to its rest position where the shutter blades are again closed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection wih the accompanying drawings, in which:

Figure 1:
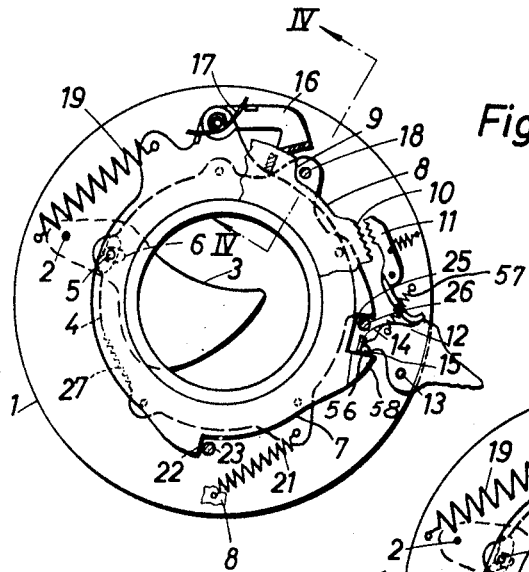
FIG. 1 shows the shutter-diaphragm assembly of the invention diagrammatically and in a rest position where the shutter blades are closed.

Referring now to the drawings, there is shown therein a shutter housing 1 which forms with walls located therein a support means for the various parts of the shutter-diaphragm assembly of the invention. One of the stationary walls within the housing 1 carries a plurality of pivot pins 2 on which the plurality of shutter blades 3 are respectively pivotally mounted, and a rotary shutter ring 4 is positioned with its center located in the optical axis, and the support means 1 supports the shutter ring 4 for rotary movement about the optical axis. The several blades 3 respectively carry a plurality of pins 5 which are respectively received in elongated slots 6 which are formed in the rotary shutter ring 4, so that when the ring 4 turns in a counterclockwise direction from the position thereof shown in FIG. 1 the blades will turn to an open position, while when the ring 4 returns, in a clockwise direction, as viewed in FIG. 1, back to the rest position thereof shown in FIG. 1 the blades will be returned to their closed position, and only one blade 3 is shown in FIG. 1 for the sake of clarity.

In addition to the shutter ring 4, the assembly includes a cocking ring 7 which is also supported for turning movement about the optical axis in which the center of the ring 7 is located, and in addition there is supported for rotary movement about the optical axis a cam ring 8 having a camming portion 9 and serving to preselect the size of the exposure aperture which will be provided by the blades 3 which also serve as diaphragm blades. The axial positions of the rings 4, 7, and 8 relative to each other are particularly apparent from FIG. 4. The manually turnable cam 8 is manually turned about the optical axis to a preselected angular position through any suitable manually operable adjusting structure which is not shown, and the cam ring 8 includes in addition a toothed portion 10 which is capable of being engaged by a pawl 11 for maintaining the ring 8 in its adjusted position during part of the operation of the assembly of the invention. A spring, which is shown connected to the pawl 11 in the drawings, urges the pawl 11 away from the toothed portion 10 of the ring 8, and a manually operable means 12 which is shown diagrammatically in the drawings cooperates with the pawl 11 to move the latter from the rest position shown in FIG. 1 to the positions shown in FIGS. 2 and 3 where the pawl 11 engages the teeth 10 so as to maintain the ring 8 in its adjusted position. The manually operable means 12 is in the form of any manually turnable lever, for example, well known in the art and turnable about the pivot pin 13 for displacing the cocking ring 7 in a clockwise direction so as to move the cocking ring from the rest position thereof shown in FIG. 1 to the end position thereof shown in FIG. 2, and the manually operable means 12 after turning the ring 7 through a given angle will release the latter for return movement to its starting or rest position.

Figure 2:
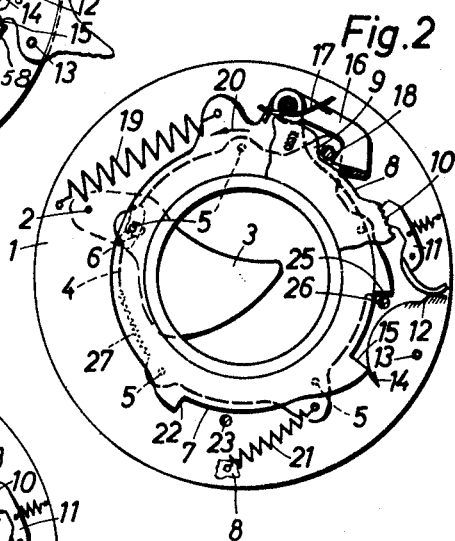
FIG. 2 shows the parts of FIG. 1 in a position where the cocking ring has been displaced to its cocked position but where the shutter blades are still closed.

In order to turn the ring 7 from its rest position shown in FIG. 1 to its end position shown in FIG. 2 the manually turnable means 12 is turned in the direction of the arrow 14, and this manually operable means 12 engages the projection 15 of the ring 7 so as to turn the latter from the position of FIG. 1 to that of FIG. 2. A tip of the manually operable means 12 rides off the projection 15 when the ring 7 has reached the position shown in FIG. 2, so that in this way the ring 7 is automatically released after having been displaced from the position of FIG. 1 through a given angle to the position of FIG. 2. A spring means 19 is operatively connected to the ring 7 to urge the latter to the rest position thereof shown in FIG. 1, and of course the ring 7 is turned by the manually operable means 12 from the position of FIG. 1 to that of FIG. 2 in opposition to the spring means 19. The lever 12 is urged to its rest position shown in FIG. 1 of a spring 57, and any suitable stop is provided to limit the clockwise turning of the lever 12 by the spring 57 so that the lever 12 returns to the position shown in FIG. 1. At its end which engages the surface 15 of the ring 7, the lever 12 carries a springy finger 56 which is rigid enough to turn the ring 7 in opposition to the spring 19 in the manner described above but which will yield during the return movement of the lever 12 to its starting position shown in FIG. 1. This springy finger 56 rides over an inclined surface portion 58 of the ring 7, the elevation of the inclined surface portion 58 at the outer periphery of the ring 7 being such that the free end of the finger 56 will ride onto the surface 58 during the return movement of the lever 12 and this finger will simply snap behind the projection 15 when the lever 12 reaches the position shown in FIG. 1.

A coupling means is provided for coupling the ring 7 to the ring 4, and this coupling means includes a pawl 16 which is pivotally carried by a portion of the ring 7 and which is urged by the spring 17 to turn with respect to the ring 7 in a clockwise direction, as viewed in FIG. 1. The coupling means includes in addition to the pawl 16 a projection or pin 18 which is carried by the shutter ring 4 in the path of movement of the pawl 16 when the cocking ring 7 is turned by the operator from the position of FIG. 1 to that of FIG. 2. When the cocking ring 7 reaches the end position shown in FIG. 2 the spring 17 will move the pawl 16 behind the pin 18 so that in this way the coupling means 16, 18 is placed in its coupled position coupling the ring 7 to the ring 4.

Figure 3:
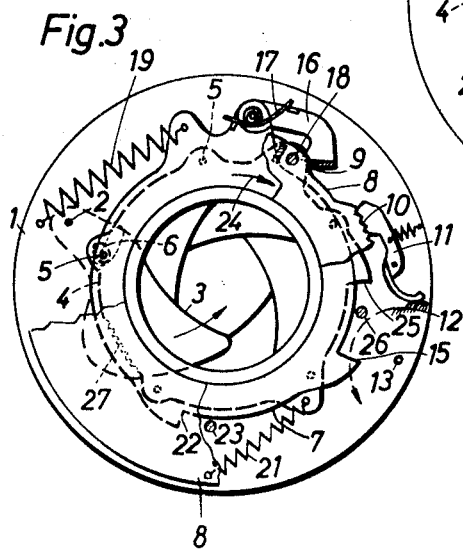
FIG. 3 shows the parts in the position they take during return of the cocking ring to its rest position with the blades open and the shutter ring about to return back to its rest position for closing the blades.
Figure 4:
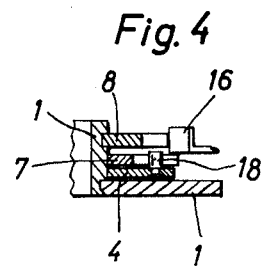
FIG. 4 shows an axial view of the structure taken along the line IV—IV of FIG. 1 in the direction of the arrows.

As soon as the manually operable means 12 rides off the projection 15, as described above and as is shown diagrammatically in FIG. 2, the ring 7 which has been coupled by the coupling means 16, 18 to the ring 4 will be returned by the spring 19 to its rest position, and the ring 7 at this time turns in the direction of the arrow 20 shown in FIG. 2, and of course the coupling means 16, 18 will cause the ring 4 to turn also in the direction of the arrow 20 together with the ring 7. A spring means 21, which is weaker than the spring means 19, is operatively connected to the ring 4 for urging the latter in a clockwise direction to the rest position thereof shown in FIG. 1, and thus, during turning of the ring 4 together with the ring 7 in the direction of the arrow 20 the spring means 21 is tensioned. The camming portion 9 is placed in the path of movement of the pawl 16 at a predetermined position in accordance with the selection of the angular position of the camming ring 8, and thus after the ring 4 has turned with the ring 7 in the direction of the arrow 20 of FIG. 2 through an angle sufficient to cause the pawl 16 to engage the camming portion 9, this camming portion 9 will raise the pawl 16 away from the pin 18 so as to uncouple the coupling means 16, 18, and this is the position of the parts which is shown in FIG. 3. It should be noted that the pin 18 can move behind the portion 9 of the ring 8, while the outer end of the pawl 16 is wide enough, in the direction of the optical axis, to cooperate both with the pin 18 as well as with the camming portion 9. Thus, when turning from the position of FIG. 1 to that of FIG. 2 the pawl 16 will simply ride off the camming portion 9 and then over the pin 18 to the position of the FIG. 2, while during return of the ring 7 to its starting position the pawl 16 will displace the pin 18 behind the camming portion 9 which will then raise the pawl 18 to its uncoupled position shown in FIG. 3, and of course, once the coupling means 16, 18 is uncoupled in this way, the ring 4 is released to the spring 21 which now returns the ring 4 to its rest position, and this turning movement will of course return the blades 3 to their closed position. It will be noted that the spring 21 urges the projection 25 of the ring 4 into engagement with a stationary pin 26, so that in this way the rest position of the ring 4 is determined, and also the spring 19 urges the projection 22 of the cocking ring 7 into engagement with a stationary pin 23, so that in this way the rest position of the ring 7 is determined. When the cam 9 uncouples the coupling means 16, 18 the spring 21 turns the ring 4 in the direction of the arrow 24 of FIG. 3. It is apparent that with this construction the pin 18 will have a predetermined position when the ring 4 is in its rest position shown in FIG. 1. The manual adjusting structure which cooperates with the ring 8 is capable of locating the camming portion 9 thereof at a given angular distance from the pin 18. The closer the camming portion 9 to the pin 18 the smaller will be the opening provided by the blades 3, while the greater distance the operator displaces the camming portion 9 in a counterclockwise direction, as viewed in FIG. 1, from the pin 18, the greater will be the extent of turning of the ring 4 before the coupling means 16, 18 is uncoupled and therefore the greater will be the opening provided by the blades 3.

Of course, with an assembly where the shutter blades act also as a diaphragm it is necessary not only to be able to select the size of the exposure aperture but also to provide a selected exposure time. For this purpose the ring 4 is provided at its outer periphery with a toothed portion 27 which meshes with an unillustrated gear sector which in turn is connected by an unillustrated one-way drive to a known adjustable retarding mechanism which includes an exposure time controlling cam and an additional gear sector which is adjusted by such a cam, the gear sector which meshes with the teeth 27 being connected through such a one-way drive with the gear sector of the retarding mechanism, and this latter gear sector of course is operatively connected through the gearing of the retarding mechanism with a rotary mass, an anchor and escapement, or the like so that in this way the desired exposure time will be provided in accordance with the adjustment of the retarding mechanism which is per se well known in the art. The one-way drive is provided so that only when the ring 4 turns in the direction of the arrow 24 of FIG. 3 does the retarding mechanism provide a force retarding the turning of the ring 4, so that it is only when the latter is urged back to its rest position by the spring 21 that the retarding mechanism operates to provide the preselected exposure time. Of course, the operations until uncoupling of the coupling means 16, 18 take place very quickly so that they have practically no influence on the exposure time. Thus, the retarding mechanism will be set into operation precisely at the moment when the blades 3 provide the largest aperture which is of course selected by the adjusted angular position of the ring 8. Of course, retarding mechanisms other than one of the type referred to above may be used, and in addition, it is possible to use a releasable holding means constructed differently from elements 10 and 11 for the purpose of releasably holding the ring 8 in its adjusted position. For example, a construction which provides a clamping action in only one direction may be used. The manually operable means 12 has a camming portion cooperating with the pawl 11 in the manner shown in the drawings so that when the manually operable means 12 in turned from the position of FIG. 1 to that of FIG. 2 the camming portion of the manually operable means 12 cooperates with the pawl 11 to turn the latter from the position of FIG. 1 to that of FIG. 2, and when the manually operable means 12 turns back toward the position of FIG. 1 the pawl 11 will be returned to the position of FIG. 1 so that the ring 8 is released only after the blades 3 start to move back to their closed position.

It will be understood that each of the elements described above, or two or more together, may also find a useful application in other types of cameras differing from the types described above.

While the invention has been illustrated and described as embodied in shutter-diaphragm assemblies for cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a shutter-diaphragm assembly for a camera, in combination, support means; a plurality of shutter blades turnably carried by said support means for movement between closed and open positions; shutter ring means turnably carried by said support means and operatively connected to said blades for turning the latter from said closed to an open position when said shutter ring means turns in one direction from a given rest position thereof and for returning said blades to said closed position thereof when said shutter ring means returns to said rest position thereof; first spring means cooperating with said shutter ring means for returning the latter to said rest position thereof; cocking ring means also supported for rotary movement by said support means and turnable from a given rest position to a given end position and then back to said rest position thereof; second spring means, stronger than said first spring means, urging said cocking ring means to return to said rest position thereof; manually operable means cooperating with said cocking ring means for turning the latter in opposition to said second spring means from said rest position to said end position and for then releasing said cocking ring means for return by said second spring means to said rest position thereof; coupling means operatively connected to both of said ring means for coupling said cocking ring means to said shutter ring means during return of said cocking ring means to said rest position thereof, said second spring means acting through said cocking ring means, said coupling means, and said shutter ring means to turn the latter away from said rest position thereof in opposition to said first spring means, whereby the blades move from their closed position and become opened to a progressively increasing degree as said shutter ring means turns with said cocking ring means while the latter returns to its rest position; and manually adjustable means for providing a selected opening within a given range of openings and cooperating with said coupling means for uncoupling said ring means from each other when said shutter ring means has turned with said cocking ring means through an angle at which said blades will provide any preselected opening within said range in accordance with the adjustment of said manually adjustable means, whereby upon uncoupling of said rings from each other said first spring means returns said shutter ring means to said rest position thereof so as to return said blades to their closed position, so that the extent to which the blades are opened is preselected to enable the blades to act also as a diaphragm.

2. In a shutter-diaphragm assembly for a camera, in combination, support means; a plurality of shutter blades turnably carried by said support means for movement between closed and open positions; rotary shutter ring means carried by said support means for rotary movement and operatively connected to said blades for turning the latter from said closed to an open position during turning of said shutter ring means in one direction from a predetermined rest position thereof and for returning said blades to said closed position thereof when said shutter ring means turns in an opposite direction back to said rest position thereof; first spring means operatively connected to said shutter ring means for urging the latter to turn in said opposite direction back to said rest position thereof; cocking ring means also supported for rotary movement by said support means, said cocking ring means being also turnable from a predetermined rest position to a given end position and then back to said rest position thereof; second spring means, stronger than said first spring means, operatively connected to said cocking ring means for urging the latter to return to said rest position thereof; manually operable means cooperating with said cocking ring means for turning the latter in opposition to said second spring means from said rest to said end position thereof and for then releasing said cocking ring means to be returned by said second spring means to said rest position thereof; pawl means turnably carried by said cocking ring means for turning movement therewith; a projection carried by said shutter ring means in the path of movement of said pawl means when said cocking ring means is turned by said manually operable means from said rest to said end position thereof, said pawl means cooperating with said projection to turn said shutter ring means with said cocking ring means during return of the latter by said second spring means to said rest position of said cocking ring means, said shutter ring means when thus turning with said cocking ring means turning in opposition to said first spring means and moving said blades from said closed position thereof to an open position; and manually adjustable cam means for providing a selected opening within a given range of openings said cam means being located in the path of movement of said pawl means for moving the latter away from said projection when said shutter ring means has turned with said cocking ring means through a preselected angle providing any preselected opening of said shutter blades within said range, whereby said first spring means will then return said shutter ring means to said rest position thereof and said shutter blades will return to their closed position.

3. In a shutter-diaphragm assembly for a camera, in combination, support means; a plurality of shutter blades turnably carried by said support means for movement between closed and open positions; rotary shutter ring means carried by said support means for rotary movement and operatively connected to said blades for turning the latter from said closed to an open position during turning of said shutter ring means in one direction from a predetermined rest position thereof and for returning said blades to said closed position thereof when said shutter ring means turns in an opposite direction back to said rest position thereof; first spring means operatively connected to said shutter ring means for urging the latter to turn in said opposite direction back to said rest position thereof; cocking ring means also supported for rotary movement by said support means, said cocking ring means being also turnable from a predetermined rest position to a given end position and then back to said rest position thereof; second spring means, stronger than said first spring means, operatively connected to said cocking ring means for urging the latter to return to said rest position thereof; manually operable means cooperating with said cocking ring means for turning the latter in opposition to said second spring means from said rest to said end position thereof and for then releasing said cocking ring means to be returned by said second spring means to said rest position thereof; pawl means turnably carried by said cocking ring means for turning movement therewith; a projection carried by said shutter ring means in the path of movement of said pawl means when said cocking ring means is turned by said manually operable means from said rest to said end position thereof, said pawl means cooperating with said projection to turn said shutter ring means with said cocking ring means during return of the latter by said second spring means to said rest position of said cocking ring means, said shutter ring means when thus turning with said cocking ring means turning in opposition to said first spring means and moving said blades from said closed position thereof to an open position; manually adjustable cam means for providing a selected opening within a given range of openings, said cam means being located in the path of movement of said pawl means for moving the latter away from said projection when said shutter ring means has turned with said cocking ring means through a preselected angle providing any preselected opening of said shutter blades within said range, whereby said first spring means will then return said shutter ring means to said rest position thereof and said shutter blades will return to their closed position; and releasable holding means cooperating with said manually adjustable cam means for releasably holding the latter in the adjusted position thereof, said releasable holding means being controlled by said manually operable means for releasably holding said cam means in said adjusted position thereof during turning of said cocking ring means toward said end position thereof and releasing said adjustable cam means after the blades start to return to their closed position.

4. In a shutter-diaphragm assembly for a camera, in combination, support means; a plurality of shutter blades turnably carried by said support means for movement between closed and open positions; shutter ring means turnably carried by said support means and operatively connected to said blades for turning the latter from said closed to an open position when said shutter ring means turns in one direction from a given rest position thereof and for returning said blades to said closed position thereof when said shutter ring means returns to said rest position thereof; first spring means cooperating with said shutter ring means for returning the latter to said rest position thereof; cocking ring means also supported for rotary movement by said support means and turnable from a given rest position to a given end position and then back to said rest position thereof; second spring means, stronger than said first spring means, urging said cocking ring means to return to said rest position thereof; manually operable means cooperating with said cocking ring means for turning the latter in opposition to said second spring means from said rest position to said end position and for then releasing said cocking ring means for return by said second spring means to said rest position thereof; coupling means operatively connected to both of said ring means for coupling said cocking ring means to said shutter ring means during return of said cocking ring means to said rest position thereof, said second spring means acting through said cocking ring means, said coupling means, and said shutter ring means to turn the latter away from said rest position thereof in opposition to said first spring means, whereby the blades move from their closed position and become opened to a progressively increasing degree as said shutter ring means turns with said cocking ring means while the latter returns to its rest position; manually adjustable means for providing a selected opening within a given range of openings and cooperating with said coupling means for uncoupling said ring means from each other when said shutter ring means has turned with said cocking ring means through an angle at which said blades will provide any preselected opening within said range in accordance with the adjustment of said manually adjustable means, whereby upon uncoupling of said rings from each other said first spring means returns said shutter ring means to said rest position thereof so as to return said blades to their closed position, so that the extent to which the blades are opened is preselected to enable the blades to act also as a diaphragm; and retarding means cooperating with said shutter ring means for retarding the return thereof by said first spring means to said rest position of said shutter ring means so as to provide a predetermined exposure time.

5. In a shutter-diaphragm assembly for a camera, in combination, support means; a plurality of shutter blades turnably carried by said support means for movement between closed and open positions; shutter ring means turnably carried by said support means and operatively connected to said blades for turning the latter from said closed to an open position when said shutter ring means turns in one direction from a given rest position thereof and for returning said blades to said closed position thereof when said shutter ring means returns to said rest position thereof; first spring means cooperating with said shutter ring means for returning the latter to said rest position thereof; cocking ring means also supported for rotary movement by said support means and turnable from a given rest position to a given end position and then back to said rest position thereof; second spring means, stronger than said first spring means, urging said cocking ring means to return to said rest position thereof; manually operable means cooperating with said cocking ring means for turning the latter in opposition to said second spring means from said rest position to said end position and for then releasing said cocking ring means for return by said second spring means to said rest position thereof; coupling means operatively connected to both of said ring means for coupling said cocking ring means to said shutter ring means during return of said cocking ring means to said rest position thereof, said second spring means acting through said cocking ring means, said coupling means, and said shutter ring means to turn the latter away from said rest position thereof in opposition to said first spring means, whereby the blades move from their closed position and become opened to a progressively increasing degree as said shutter ring means turns with said cocking ring means while the latter returns to its rest position; manually adjustable means for providing a selected opening within a given range of openings and cooperating with said coupling means for uncoupling said ring means from each other when said shutter ring means has turned with said cocking ring means through an angle at which said blades will provide any preselected opening within said range in accordance with the adjustment of said manually adjustable means, whereby upon uncoupling of said rings from each other said first spring means returns said shutter ring means to said rest position thereof so as to return said blades to their closed position, so that the extent to which the blades are opened is preselected to enable the blades to act also as a diaphragm; and retarding means cooperating with said shutter ring means for retarding the return thereof by said first spring means to said rest position of said shutter ring means so as to provide a predetermined exposure time, said shutter ring means having a toothed peripheral portion with which said retarding means cooperates.

6. In a shutter-diaphragm assembly for a camera, in combination, support means; a plurality of shutter blades turnably carried by said support means for movement between closed and open positions; shutter ring means turnably carried by said support means and operatively connected to said blades for turning the latter from said closed to an open position when said shutter ring means turns in one direction from a given rest position thereof and for returning said blades to said closed position thereof when said shutter ring means returns to said rest position thereof; first spring means cooperating with said shutter rings means for returning the latter to said rest position thereof; cocking ring means also supported for rotary movement by said support means and turnable from a given rest position to a given end position and then back to said rest position thereof; second spring means, stronger than said first spring means, urging said cocking ring means to return to said rest position thereof; manually operable means cooperating with said cocking ring means for turning the latter in opposition to said second spring means from said rest position to said end position and for then releasing said cocking ring means for return by said second spring means to said rest position thereof; coupling means operatively connected to both of said ring means for coupling said cocking ring means to said shutter ring means during return of said cocking ring means to said rest position thereof, said second spring means acting through said cocking ring means, said coupling means, and said shutter ring means to turn the latter away from said rest position thereof in opposition to said first spring means, whereby the blades move from their closed position and become opened to a progressively increasing degree as said shutter ring means turns with said cocking ring means while the latter returns to its rest position; manually adjustable means cooperating with said coupling means for uncoupling said ring means from each other when said shutter ring means has turned with said cocking ring means through an angle at which said blades will provide a preselected opening in accordance with the adjustment of said manually adjustable means whereby upon uncoupling of said rings from each other said first spring means returns said shutter ring means to said rest position thereof so as to return said blades to their closed position, so that the extent to which the blades are opened is preselected to enable the blades to act also as a diaphragm; and retarding means cooperating with said shutter ring means for retarding the return thereof by said first spring means to said rest position of said shutter ring means so as to provide a predetermined exposure time, said shutter ring means having a toothed peripheral portion with which said retarding means cooperates and said retarding means including a one-way drive which sets said retarding means into operation only during return movement of said shutter ring means by said first spring means toward said rest position of said shutter ring means.

7. In a shutter-diaphragm assembly for a camera, in combination, support means; a rotary shutter ring turnably carried by said support means for turning movement toward and away from a predetermined rest position; a first spring operatively connected to said shutter ring for urging the latter to said rest position thereof; a plurality of shutter blades operatively connected to said shutter ring to be turned thereby from a closed to an open position when said shutter ring turns away from said rest position thereof and to be returned to said closed position when said shutter ring again returns to said rest position thereof; a rotary cocking ring coaxial with said shutter ring and also turnably supported by said support means for turning movement from a predetermined rest position to a given end position and then back to said rest position; a second spring, stronger than said first spring, operatively connected to said cocking ring for urging the latter to said rest position thereof; manually operable means cooperating with said cocking ring for turning the latter in opposition to said second spring from said rest to said end position thereof and then releasing said cocking ring for return movement by said second spring to said rest position thereof; a pawl turnably carried by said cocking ring and turning with the latter; a pin carried by said shutter ring in the path of movement of said pawl and engaged thereby when said cocking ring reaches said end position thereof so that during return of said cocking ring by said second spring to said rest position thereof turning of said cocking ring is transmitted by said pawl and pin to said shutter ring for turning the latter in opposition to said first spring to move said blades from their closed position to an open position; and an adjustable cam means for providing a selected opening within a given range of openings, said cam means being located in the path of movement of said pawl and turning the latter away from said pin during return of means turning said pawl away from said pin at a preselected moment during the return of said cocking ring toward said rest position thereof, providing any selected opening within said range, so that said shutter ring will be released for return by said first spring to said rest position after the blades have been opened to a preselected extent.

References Cited by the Examiner
UNITED STATES PATENTS 2,969,007  1/61  Groger _____ 95—56
3,051,065  8/62  Kobayashi _____ 95—64 X NORTON ANSHER, *Primary Examiner.*
JOHN M. HORAN, *Examiner.*